US012601951B2

(12) United States Patent
Mak et al.

(10) Patent No.: US 12,601,951 B2
(45) Date of Patent: Apr. 14, 2026

(54) BEAM-STEERING DEVICE AND METHOD FOR SPATIAL STEERING OF A LIGHT BEAM

(71) Applicant: Max-Planck-Gesellschaft zur Foerderung Der Wissenschaften e. V., Munich (DE)

(72) Inventors: Jason Mak, Halle (DE); Youngho Jung, Halle (DE); Wesley Sacher, Halle (DE); Joyce Poon, Halle (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 303 days.

(21) Appl. No.: 18/558,466

(22) PCT Filed: May 3, 2022

(86) PCT No.: PCT/EP2022/061802
§ 371 (c)(1),
(2) Date: Nov. 1, 2023

(87) PCT Pub. No.: WO2022/233842
PCT Pub. Date: Nov. 10, 2022

(65) Prior Publication Data
US 2024/0231177 A1 Jul. 11, 2024

(30) Foreign Application Priority Data

May 7, 2021 (EP) .................................... 21172767

(51) Int. Cl.
*G02F 1/29* (2006.01)
*G02F 1/01* (2006.01)
(52) U.S. Cl.
CPC ............ *G02F 1/292* (2013.01); *G02F 1/0147* (2013.01); *G02F 2201/06* (2013.01);
(Continued)

(58) Field of Classification Search
None
See application file for complete search history.

(56) References Cited

U.S. PATENT DOCUMENTS 5,504,772 A 4/1996 Deacon et al.
5,887,089 A 3/1999 Deacon et al.
(Continued)

FOREIGN PATENT DOCUMENTS

CN 108776367 A 11/2018

OTHER PUBLICATIONS

Doylend et al., "Two-Dimensional Free-Space Beam Steering With an Optical Phased Array on Silicon-on-Insulator", Optics Express, vol. 19, No. 22, pp. 21595-21604 (2011).
(Continued)

*Primary Examiner* — Chad H Smith
(74) *Attorney, Agent, or Firm* — Caesar Rivise, PC

(57) ABSTRACT

A beam-steering device (100) for spatial steering of a light beam comprises a waveguide array (10) being arranged on a substrate (50) and comprising a waveguide array input (12), multiple waveguides (**14-1, 14-2, . . . , 14-*i*) and a waveguide array output (16), wherein the multiple waveguides (14-1, 14-2, . . . , 14-*i*) are adapted for simultaneously guiding light from the waveguide array input (12) to the waveguide array output (16) and for forming a light beam downstream of the waveguide array output (16) by superimposing the light guided by the waveguides (14-1, 14-2, . . . , 14-*i*), a phase shifter device (18) being arranged for applying controlled phase shifts to the light guided in each of the waveguides (14-1, 14-2, . . . , 14-*i*), and a grating array (22) including at least one patterned grating in optical communication with the waveguide array output (16), the grating array (22) being configured to radiate the light beam out of the beam-steering device (100**) to a surrounding,
(Continued)

wherein the waveguide array output (16) is arranged such that the light beam is formed downstream of the waveguide array output (16) with a main lobe and side lobes and with a beam angle Φ in a plane of the substrate (50), that is determined by the controlled phase shifts applied to the light by the phase shifter device (18) and a wavelength of the light, a slab propagation region (20) is arranged between the waveguide array output (16) and the grating array (22) such that the main lobe of the light beam is angularly relayed to the grating array (22) and the side lobes of the light beam leave lateral sides of the slab propagation region (20) before reaching the grating array (22), and the grating array (22) is arranged to radiate the light beam out of the beam-steering device (100) with a first angular direction with respect to the substrate (50), that is determined by the beam angle Φ. Furthermore, a method of beam-steering a light beam is described.

17 Claims, 4 Drawing Sheets

(52) U.S. Cl.
CPC .... *G02F 2201/302* (2013.01); *G02F 2202/10* (2013.01); *G02F 2203/24* (2013.01); *G02F 2203/50* (2013.01)

(56)        References Cited

U.S. PATENT DOCUMENTS

| | | |
|---|---|---|
| 2018/0039153 A1 | 2/2018 | Hashemi et al. |
| 2019/0265574 A1* | 8/2019 | Skirlo .................. G02F 1/3136 |
| 2020/0348466 A1 | 11/2020 | Lopez et al. |

OTHER PUBLICATIONS

Hutchison et al., "High-Resolution Aliasing-Free Optical Beam Steering", Optica, vol. 3, No. 8, pp. 887-890 (2016).
Poulton et al., "Large-Scale Silicon Nitride Nanophotonic Phased Arrays at Infrared and Visible Wavelengths", Optics Letters, vol. 42, No. 1, pp. 21-24 (2017).
Sacher et al., "Bean-Steering Nanophotonic Phased-Array Neural Probes", CLEO, 2019.
Shin et al., "Chip-Scale Blue Phased Array", CLEO, 2019.
Shin et al., "Chip-Scale Blue Light Phased Array", Optics Letters, vol. 45, No. 7, pp. 1934-1937 (2020).
Sun et al., "Large -Scale Nanophotonic Phased Array", Nature, vol. 493, pp. 195-199 (2013).
European Search Report from related European Patent Application No. 21172767.2 dated Oct. 5, 2021.
International Search Report from related PCT Application No. PCT/EP2022/061802 dated Sep. 14, 2022.

* cited by examiner

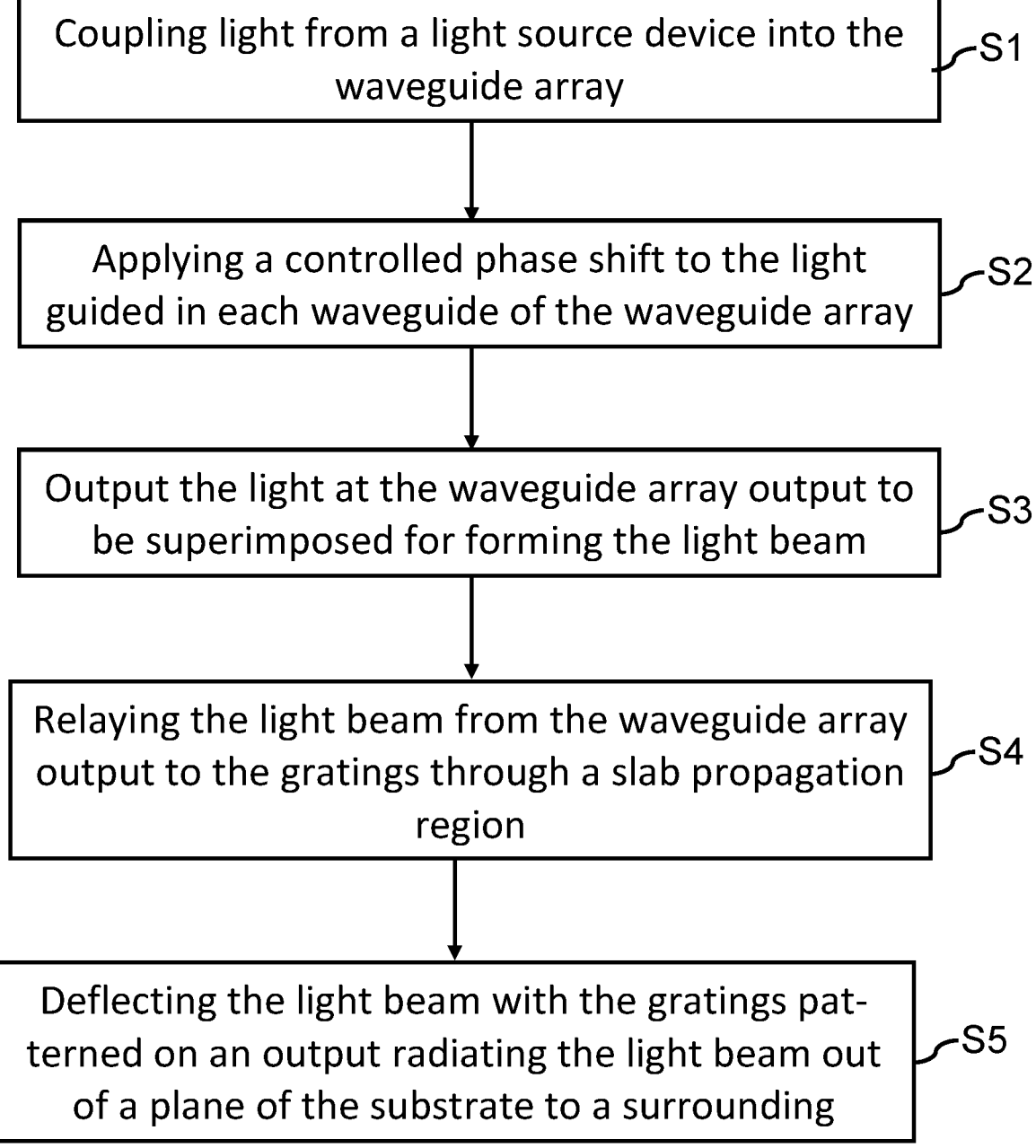

Coupling light from a light source device into the waveguide array ⟍S1

Applying a controlled phase shift to the light guided in each waveguide of the waveguide array ⟍S2

Output the light at the waveguide array output to be superimposed for forming the light beam ⟍S3

Relaying the light beam from the waveguide array output to the gratings through a slab propagation region ⟍S4

Deflecting the light beam with the gratings patterned on an output radiating the light beam out of a plane of the substrate to a surrounding ⟍S5

FIG. 4

BEAM-STEERING DEVICE AND METHOD FOR SPATIAL STEERING OF A LIGHT BEAM

CROSS-REFERENCE TO RELATED APPLICATIONS

This application is a U.S. National Phase Application of PCT/EP2022/061802, filed May 3, 2022, which claims priority to EP 21172767.2, filed May 7, 2021, the contents of which applications are incorporated herein by reference in their entireties for all purposes.

FIELD OF THE INVENTION

The invention relates to a beam-steering device and a method for spatial steering of a light beam, in particular for steering a light beam in a visible spectral range. Applications of the invention are available in the fields of, e.g., LiDAR technology, displays and implantable neural probes.

BACKGROUND OF THE INVENTION

In the present specification, reference is made to the following prior art illustrating the technical background of the invention, in particular relating to optical phased arrays:

[1] J. K. Doylend et al. in "Opt. Express" 19, 2 1595-2 1604 (2011);

[2] D. N. Hutchison et al. in "Optica" 3, 887-890 (2016);

[3] J. Sun et al. in "Nature" 493, 195-199, 2013;

[4] M. C. Shin et al. in "Optics Letters" 45, 1934-1937 (2020); and

[5] C. V. Poulton in "Optics Letters" 42, 21-24 (2017).

Optical phased arrays (OPAs) for beam-steering are an emerging technology for, e.g, LiDAR ("Light detection and ranging") and micro-displays. An OPA enables free-space beam-steering without moving parts, forming light beams by changing the relative phase and/or also the amplitude between a set of coherent emitters. For example, in an integrated photonic platform, an input laser beam is divided into multiple paths, each of which experiences a controllable phase-shift, and the phase-shifted light is superimposed at an output of the OPA and directed to the surrounding by a grating. The light coupled out of the OPA provides a light beam that is steered in the far-field by adjusting the phase-shifts.

Many photonic applications demand compact, robust solutions for steering a light beam with high steering resolution. This requires simultaneously achieving a wide steering angle and a small beam divergence. Accordingly, when forming the light beam, a narrow main lobe created by superimposing the phase-shifted light is to be maintained, while side lobes created by superimposing the phase-shifted light are to be suppressed. In other words, a far-field beam pattern is to be achieved with a single, narrow beam spot in the set steering direction originating from the main lobe, while simultaneously suppressing and/or avoiding further spots adjacent to the steering direction originating from the side lobes. To achieve a far-field beam pattern that does not have side lobes, a grating spacing between the gratings is required that is less than half the wavelength of the emitted light ($\lambda < \frac{1}{2}$).

Many demonstrations of OPAs have been reported in recent years (see for example [1] to [3]) which operate with light in the infrared spectrum. The known OPAs include abilities to steer the emitted light beam in one direction, varying an emission angle tuned by adjusting the controlled phase-shifts, as published in [1] for light wavelengths of 1525 nm to 1625 nm, or by adjusting the wavelength of the light, as published in [2] for light wavelengths of 1260 nm to 1360 nm. A possibility to steer the emitted light beam in two directions is published in [3], using a 2D arrangement of grating couplers comprising a total of 4096 grating-based optical nanoantennas and a light wavelength of 1550 nm. Any of [1] to [3] acknowledge the above criterion of less than half the wavelength for side lobe suppression.

A problem that emerges as the wavelength of light becomes shorter, in particular with light in the visible spectrum, is that it is not possible to achieve the criterion for side lobe suppression due to crosstalk between the gratings, resulting in additional side lobes.

Applications requiring visible light are, e.g., augmented and virtual reality displays, as well as quantum and biological applications relying on resonances of molecules, atoms, and ions within the visible spectral range for micron-scale optical stimulation. One explicit example includes a neural probe based on OPAs for studying the functionality of neural circuits of the brain by optical stimulation and/or activity readout of neurons.

OPAs adapted for light in the visible spectrum have been investigated as described e. g. in [4] and [5], but they are limited to one dimensional beam-steering via phase-shifting and the grating spacing in the arrays is significantly larger than the above half-wavelength condition, leading to significant side lobes. In [4], measurements are presented with red light at a wavelength of 635 nm and an OPA with a grating spacing of 2 μm, causing the significant number of created side lobes. The publication of [5] argues that the criterion for side lobe suppression cannot be met for visible light. Instead, [5] proposes to create side lobes far away from the main lobe, using an aperiodic gratings arrangement with a grating spacing of multiple wavelength λ, having an average spacing of 31.5λ and minimum spacing of 4λ, wherein measurements using blue light at a wavelength of 488 nm are presented.

Objective of the Invention

An objective of the invention is to provide improved devices and methods for spatial steering of a light beam to overcome disadvantages of conventional techniques. In particular, spatial steering of a light beam is to be provided with suppressed or at least significantly reduced side lobe emission, especially with light in the visible or infrared spectral range. Optionally, spatial steering with two different angular directions, in particular using light in the visible spectral range, is to be provided.

SUMMARY OF THE INVENTION

The above objective is solved by a beam-steering device and/or a method for spatial steering of a light beam, comprising the features of the independent claims. Advantageous embodiments and applications of the invention are defined in the dependent claims.

According to a first general aspect of the invention, the above objective is solved by a beam-steering device, being configured for spatial steering of a light beam, preferably forming a single light beam, in particular a light beam with a wavelength in the visible or infrared spectrum. The visible spectrum generally refers to light with a wavelength between 380 nm and 750 nm, and the infrared spectrum refers to light with a wavelength between 750 nm to 2500 nm. The beam-steering device comprises a waveguide array being arranged on a substrate and comprising a waveguide array input, multiple waveguides and a waveguide array output. The multiple waveguides are adapted for simultaneously guiding light from the waveguide array input to the waveguide array output and for forming a light beam by superimposing the light guided by the waveguides. In particular, the waveguide array is arranged for forming the light beam by superimposing the light exiting the waveguides downstream of the waveguide array output.

Furthermore, the beam-steering device comprises a phase shifter device being arranged for applying controlled phase shifts to the light guided in each of the waveguides. By the operation of the phase shifter device, light fractions arriving at the waveguide array output have a specific phase in each waveguide and specific phase differences between different waveguides.

The beam-steering device further comprises a grating array including at least one patterned grating in optical communication with the waveguide array output. The grating array provides an output of the beam-steering device. The grating array is configured to radiate the light beam out of the beam-steering device to a surrounding. The grating array may comprise one single patterned grating. Alternatively, the grating array may comprise two or more patterned gratings.

According to the invention, a slab propagation region is arranged between the waveguide array output and the grating array and the waveguide array output is arranged such that the light beam is formed with a main lobe and side lobes and with a beam angle ($\phi$) in the slab propagation region, wherein the beam angle ($\phi$) is determined by the controlled phase shifts applied to the light by the phase shifter device and a wavelength of the light. Furthermore, according to the invention, the slab propagation region is arranged between the waveguide array output and the grating array such that the main lobe of the light beam is angularly relayed to the grating array and the side lobes of the light beam leave lateral sides of the slab propagation region before reaching the grating array, and the grating array is arranged to radiate the light beam out of the beam-steering device with a first angular direction with respect to the substrate, that is determined by the beam angle ($\phi$). The first angular direction determines a beam-steering angle of the light beam output by the beam-steering device.

According to a second general aspect of the invention, the above objective is solved by method of spatial steering of a light beam, preferably a light beam in the visible or infrared spectrum. The method comprises the step of coupling light from a light source device into a waveguide array being arranged on a substrate and comprising a waveguide array input, multiple waveguides and a waveguide array output. The multiple waveguides simultaneously guide the light from the waveguide array input to the waveguide array output, and a controlled phase shift is applied to the light guided in each of the waveguides.

The method further comprises the step of deflecting the light beam with a grating array including at least one patterned grating in optical communication with the waveguide array output. The grating array radiates the light beam out of the output to a surrounding.

According to the invention, a slab propagation region is arranged between the waveguide array output and the grating array and the light beam is formed with a main lobe and side lobes and with a beam angle ($\phi$) in the slab propagation region, wherein the beam angle ($\phi$) is determined by the controlled phase shifts applied to the light by the phase shifter device and a wavelength of the light. Furthermore, according to the invention, the slab propagation region is arranged between the waveguide array output and the grating array such that the main lobe of the light beam is angularly relayed to the grating array and the side lobes of the light beam leave lateral sides of the slab propagation region before reaching the grating array, and the grating array radiates the light beam out of the beam-steering device with a first angular direction with respect to the substrate, that is determined by the beam angle.

Preferably, the inventive method or an embodiment thereof is executed with the beam-steering device according to the first general aspect of the invention or an embodiment thereof.

The beam-steering device and the method of spatial steering of a light beam incorporate the overall known principle of optical phased arrays (OPAs). Coherent light, which can be described by an optical wave with a specific phase and amplitude, is split into a number of light fractions, the phase and/or the amplitude of each light fraction is then shifted, and finally, the light fractions are coupled-out of the OPAs to produce a light beam (i.e., an optical wavefront) with an engineered direction of propagation adjustable by the controlled phase shifts of the light fractions. The light beam is produced by the fractions due to interference effects, resulting in a far-field radiation pattern with the main lobe in the engineered direction.

Advantageously, the inventors have found that the deployment of an output region comprising the slab propagation region and the grating array at the light beam emitting at the end of the waveguide array results in the suppression (or at least a significant reduction) of the side lobes. The significant reduction of side lobes refers to a situation wherein at least one side lobe occurs that can be neglectable with a particular application of the inventive beam-steering device. Specifically, instead of the light beam forming after the light has been coupled out of the beam-steering device (as it is the case with the conventional techniques), the light beam is (partially) formed in the slab propagation region before the light is out-coupled by the grating array. This is achieved by adjusting each fraction of phase-shifted light guided in the waveguides into close proximity to each other and guide them into the single slab propagation region, where the light superimposes and produces the light beam due to interference. The light beam, which comprises the main lobe and possible side lobes, is angularly relayed through the slab propagation region, wherein the dimensions of the slab propagation region are adapted such that preferably only the main lobe reaches the grating array where it is radiated out of the beam-steering device. The side lobes, however, reach and leave lateral sides of the slab propagation region before reaching the grating array.

The light beam is directed through the slab propagation region in a reference plane parallel to a main plane of the substrate. The main plane of the substrate may be parallel to the surface of the substrate on which the waveguide array, the slab propagation region and the grating array are arranged. Furthermore, the light beam is angularly relayed through the slab propagation region by the beam angle $\phi$ (or: $\phi_{in}$). The beam angle $\phi$ is an angle of the light beam in the reference plane relative to the light propagation direction at the waveguide array output. The beam angle $\phi$ is adjustable by the controlled phase shift of the light guided in each of the waveguides and/or by tuning the wavelength of the light. The radiation of the light beam out of the beam-steering device may be also defined with respect to the main plane of the substrate, such that the grating array radiates the light beam out of the plane of the substrate to a surrounding.

Without applying the controlled phase shifts, the light beam is not angular relayed, i.e., $\phi=0°$. The propagation direction of the light beam at the beam angle of $\phi=0°$ may be parallel to the distance direction between the waveguide array output (specifically, the optical connection between the waveguide array output and the slab propagation region) and the grating array. The propagation direction of the light beam at the beam angle of $\phi=0°$ may align with a longitudinal axis of the slab propagation region. The position at which the light beam reaches the grating array is variable by adjusting the beam angle $\phi$.

The first angular direction is (directly) dependent on the beam angle $\phi$. The first angular direction can be defined by a spherical coordinate system with the azimuth axis in longitudinal direction of the beam-steering device and the polar axis in normal direction of the beam-steering device. The azimuthal angle can correspond to the beam angle $\phi$. The polar angle depends on the design of the beam-steering device and in particular the pattern of the at least one grating.

The slab propagation region is a single (passive) component providing free propagation of the formed light beam. Free propagation means that the light beam is not confined to the interior of the slab propagation region and the walls of the slab propagation region do not provide total reflection, in contrast to the waveguides. A first side of the slab propagation region is optically connected to the waveguide array output. A second side of slab propagation region is optically connected to the grating array, wherein the second end is arranged at an opposite side of the slab propagation region than the first side. The volume of the slab propagation region is defined by the first side, the second side, and the lateral sides.

The dimensions of the slab propagation region can be chosen depending on the desired beam angle range of beam angle $\phi$. In other words, a length and/or width of the slab propagation region can be chosen so that the light beam (specifically, the main lobe) with a maximum beam angle of $\phi_{max}$ (or $-\phi_{max}$) can reach the at least one grating. The light beam with an angle above $\phi_{max}$ leaves a lateral side of the slab propagation region before reaching the at least one gratings.

The slab propagation region may have a length along the distance direction between the waveguide array output and the grating array of e. g. 50 μm to 400 μm, preferably of 100 μm to 200 μm. Advantageously, the inventors found that such a length of the slab propagation region sufficiently meets the requirements to form a light beam and angularly relay said light beam to the grating array, whereas the side lobes of the light beam leave lateral sides of the slab propagation region before reaching the grating array. Furthermore, a width of the slab propagation region can be chosen with respect to the length and the desired beam angle range of $\phi$.

Advantageously, a broad variety of dielectric materials known in prior art for no all or at least minimum optical losses can be chosen for the slab propagation region. Preferably, the slab propagation region may be made of the same material, such as silicon nitride, and/or thickness, such as below 500 nm, as the waveguides. The slab propagation region may be integrally formed with the waveguides. A width of the slab propagation region may be chosen with respect to the length and the desired beam angle range of $\phi$. For instance, to obtain a beam steering angle of ±30°, the length and width of slab propagation region may have 100 μm and at least 60 μm, respectively, for the side lobe suppression.

Gratings are known in the prior art, used e. g. as nanophotonic antennas to radiate light of an OPA. According to a preferred variant of the invention, the at least one grating comprises one of a concave, a linear, and a convex grating pattern with respect to a propagation direction of the light beam in the slab propagation region. As an example, the grating pattern comprises multiple protrusions arranged with a constant grating pitch between the neighbouring protrusions. The grating pitch may be equal or bigger than half the wavelength of the light beam and the grating array may comprise at least 100 protrusions. The grating array may be made of the same material with the waveguide array and slab propagation region. The final output beam-steering angle, which is related to the first angular direction, is dependent on the grating pattern of the grating array. The output beam-steering angle from the concave grating pattern may be the same with or lower than the beam propagation angle of $ in the slab propagation region. However, a wider output beam-steering angle may be achieved from the linear grating pattern due to additional contribution to a propagation constant with respect to the angled beam propagation. Furthermore, the convex grating pattern may provide the largest beam steering angle among them.

The second side of the slab propagation region (opposite to the first side thereof) may have the same shape like the grating pattern. In particular, the second side of the slab propagation region may have a concave, flat or convex profile in alignment with the concave, linear or convex grating pattern, respectively. The linear pattern may be aligned parallel to the second side of the slab propagation region and/or perpendicular to the longitudinal axis of the slab propagation region.

The grating pattern may be symmetrically arranged with respect to the longitudinal axis of the slab propagation region. A symmetrical axis of the grating pattern may align with the longitudinal axis of the slab propagation region. The light beam at the beam angle of $\phi=0°$ may reach the grating array at a position along the symmetrical axis of the grating pattern.

Advantageously, if the grating array includes multiple gratings, it is not necessary that the grating spacing between neighboring gratings of the grating array is smaller than half the wavelength of the light beam. As the light beam already has been formed in the beam-steering device with only the main lobe reaching the gratings, no criteria regarding side lobe suppression needs to be met by the gratings. This is in particular advantageous for light with short wavelengths, specifically light in the visible spectrum.

Overall, the combination of the slab propagation region and the grating array uniquely overcomes the challenges of common OPAs designed for steering light in the visible spectrum, where fabrication feature sizes may not be small enough to achieve single-lobe emission, and/or broad wavelength tunable light source devices, such as continuous-wave lasers, are not available. The invention makes beam-steering possible using an integrated waveguide platform for the visible spectrum with a single wavelength input. The design can also be applied to infrared wavelengths, e. g. wavelengths between 700 nm and 1100 nm, which may share some of the problems of visible wavelength applications, such as incompatibility with standard silicon photonic platforms and circuits.

Waveguides are commonly known in the prior art, adapted for routing and guiding the light (i.e., optical waves) from one end of the respective waveguide to the other end. The working principal of waveguides is that the propagating light is confined inside the respective waveguide due to the higher refractive index of its material compared to the surrounding material.

According to preferred variants of the invention, each of the waveguides is made of silicon nitride, silicon and/or silicon oxynitride. Advantageously, any of these materials ensure high confinement and minimizing optical losses of the propagating light, providing the desirably high refractive index compared to the material of the substrate. Silicon nitride is particularly preferred, as it is transparent for light at visible wavelengths. Alternatively, other high refractive dielectric materials known in the prior art may be used for the present invention.

Preferably, each of the waveguides has a thickness below 500 nm. As known in the prior art, the dimensions of each waveguide may be chosen for a specific target wavelength region, specifically for light in the visible or infrared spectrum, depending on the material of the respective waveguide. Additionally, the dimensions may be adjusted to support a single mode (a particular electromagnetic field pattern of the optical wave in the plane with respect to the wave's propagation direction) while suppressing the propagation of higher order modes.

Furthermore, a waveguide pitch (i.e., a waveguide spacing) between neighboring waveguides may be at least 1 μm, preferably between 1 μm and 2 μm. Advantageously, this waveguide pitch is sufficiently high to suppress or at least significantly reduce optical coupling of the light guided in each of the waveguides. Optical coupling may cause alterations of properties of the light, which may have an influence on the beamforming, such as the width of the formed beam, and the beam-steering, such as the beam angle $\phi$.

According to a preferred variant of the invention, the waveguide array comprises at least 8 waveguides. Preferably, the number of waveguides is 2N (with N being a positive integer). Advantageously, a higher number of waveguides leads to a narrower beam width of the beam formed in the slab propagation region and emitted by the grating array. Additionally, the beam angle $\phi$ and thus the first angular direction can be adjusted more precisely with an increasing number of implemented waveguides in the waveguide array and thus an increasing number of phase shifter devices.

The waveguide array output is arranged for guiding the light from the waveguides into the slab propagation region. The light beam is produced by superimposing the light guided in the waveguides, wherein the light has to be brought into close proximity to each other. Accordingly, the waveguide array output comprises a waveguide pitch between neighboring waveguides decreasing towards the slab propagation region. The waveguide pitch (i.e., the spacing) between neighboring waveguides may be reduced at the waveguide array output such that the light fields from each of the waveguides efficiently interfere with each other in the slab propagation region, thus forming the main lobe as constructive interference of $0^{th}$ order and side lobes as interferences of higher order. With preferred examples, the waveguide pitch between neighboring waveguides at the waveguide array output is reduced down to below 700 nm, preferably to 500 nm or below. According to a preferred embodiment of the invention, the waveguide array output comprises a fan-in structure, preferably an S-bend fan-in structure.

Advantageously, the light beam is formed inside the beam-steering device. No further components are necessary for beamforming, such as a lens. Additionally, the inventors found that effects of light coupling between the end regions of the waveguides have no significant influence on the beamforming in the slab propagation region.

The waveguide pitch may be the only property of the waveguides to be varied in the waveguide array output. The thickness and/or a width of each waveguide may be constant in the waveguide area output. Each waveguide may be separately connected to the slab propagation region.

The waveguide array output may comprise an end region of each of the waveguides. The end regions are defined by the reduced waveguide pitch between neighboring waveguides towards the slab propagation region. Preferably, the waveguide array output is integrally formed with the waveguides.

The waveguide array input is arranged for splitting the light originated from a light source device into the waveguide array. The waveguide array input comprises at least one input port adapted for receiving light from the light source device and multiple output ports adapted for transferring the light to the multiple waveguides. Preferably, each of the multiple output ports is assigned to one of the waveguides, wherein the assigned output port is in optical communication, such as in direct contact, with one end of the respective waveguide.

According to an advantageous embodiment of the invention, the waveguide array input comprises a multimode interference coupler, in particular a series of 1×2 multimode interference coupler or a 1×N star coupler, being arranged for splitting the light originated from a light source into the waveguide array. Couplers are passive optical components which are commonly known in the prior art. Advantageously, the input light from the light source device can be split into multiple equal fractions, e.g., amplitude and phase, with each of these equal fractions guided in one of the single waveguides.

The waveguide array and the grating array may be covered by a cladding layer, preferably being made of $SiO_2$ (silicon dioxide). Accordingly, the cladding layer is arranged on top of the waveguide array and the grating array, or the waveguide array and the grating array are encapsulated by the cladding layer. Preferably, the material of the cladding layer has a smaller refractive index than the material of the waveguides in order to support the confinement effect for light propagating through the waveguides.

According to a preferred variant of the invention, the phase shifter device comprises multiple phase shifter elements, each of which being coupled with one of the waveguides. Phase shifter elements inducing a phase shift of the propagating optical wave, i.e., the light guided in the respective waveguide are known in the prior art. In general, these phase shifter elements rely on the principle of changing the effective optical path length of the propagating optical wave, and thus the refractive index of the waveguide material. According to preferred variants of the invention, each of the phase shifter elements comprises one of a thermo-optic, electro-optic, liquid crystal, and micro-electromechanical-systems device. Advantageously, known phase shifting technique can be deployed for the invention. For example, phase shifting with the thermo-optic phase shifter element relies on a variation of the temperature-dependent refractive index of the waveguide material, e.g., by controlling a local temperature of each of the waveguides by adjusting the temperature of a heating device attached to or in the vicinity of each of the waveguides.

According to another preferred embodiment of the invention, the beam-steering device further comprises a light source device being coupled into the waveguide array input. The coupling between the light source device and the waveguide area input comprises an optical communication of the light source device with the waveguide area input. Light emitted by the light source device is directed to and received by the waveguide array input. The coupling may be formed by a waveguide or an optical fiber arranged between the light source device and one end of the waveguide array input. Alternatively, the light source device can be directly arranged at the input port of the waveguide array input.

Preferably, the light source device may be a source of coherent light. The light source device may comprise a laser and/or a monochromatic light source. The light source device may emit light with a wavelength in the visible spectrum (380 nm to 750 nm), the infrared spectrum (750 nm to 2500 nm) or a wavelength range covering portions of the visible and infrared spectra, e. g., 700 nm to 1100 nm. Additionally, the light source device may be tunable with respect to the wavelength of the emitted light. The wavelength of the emitted light can be varied for adjusting the first angular direction of the radiated light beam. As an alternative to the light source device, an external light source not part of the beam-steering device can be provided for performing the method for spatial steering a light beam.

With a further variant of the invention, the phase shifter device may comprises a light source device with a tunable wavelength of emission. Advantageously, this provides another option for applying controlled phase shifts to the light guided in the waveguides.

According to another advantageous embodiment of the invention, the beam-steering device further comprises a temperature setting device being arranged for setting a temperature of at least a portion of the substrate (or the beam-steering device). The substrate with the waveguide array, the slab propagation region and the grating array can be configured for a temperature-dependent deflection of the grating array along a second angular direction deviating from the first angular direction.

To this end, the beam-steering device may further comprise a metal layer being arranged on the substrate. Preferably, the metal layer (or an additional layer of any other material) and the substrate have different thermal expansion coefficients. Additionally, the metal layer and the cladding layer may have different thermal expansion coefficients. The metal layer and the substrate may form a bicomponent material, like a bimetal. The temperature setting device may be arranged for setting a temperature of at least a portion of the metal layer, preferably adjacent to the portion of the substrate.

According to further embodiment of the invention, the beam-steering device may comprise an actuation device being configured for a mechanical actuation of a deflection of the substrate with the waveguide array, the slab propagation region and the grating array along a second angular direction deviating from the first angular direction. The actuation device may comprise e. g., a piezoelectric drive.

Advantageously, the inventors found measure for adjusting the second angular direction of the radiated light beam with respect to the substrate via thermal and/or mechanical actuation, additionally to adjusting the first angular direction. Specifically, when the propagation direction of the light beam is defined by spherical coordinates, this approach provides the possibility to adjust the polar angle, in addition to adjusting the azimuthal angle by varying the beam angle $\phi$. As stated before, the approach of adjusting the first angular direction by controlled phase shifting and/or varying the wavelength of the light, leads to an adjustment of the azimuthal angle of the propagation direction of the light beam, whereas the polar angle of the propagation direction of the light beam is fixed by, e.g., the design of the pattern of the at least one grating of the grating array. By changing the temperature of at least the portion of the metal layer, the polar angle is additionally adjusted.

The approach of a temperature-dependent deflection of the grating array is based on thermal expansion of materials. By changing, in particular increasing, the temperature of at least the portion of the metal layer, a curvature is introduced to the beam-steering device in longitudinal direction of the beam-steering device. In particular, when the metal layer with a higher thermal expansion coefficient compared with that of the substrate is provided, and the temperature of the portion of the metal layer is increased, the metal layer has a larger expansion in longitudinal direction compared with the substrate. As a result, the beam-steering device shows a curvature in the longitudinal direction towards the substrate, in accordance to the bimetal effect as known in the prior art. Analogously, the beam-steering device shows a curvature in the longitudinal direction towards the metal layer, when the thermal expansion coefficient of the metal layer is lower than that of the substrate. Notwithstanding, increasing the temperature of the beam-steering device also may lead to thermal expansions in other directions, which are smaller and thus have a smaller impact than the expansion in the longitudinal direction.

According to another preferred embodiment of the invention, a section of the substrate carrying the waveguide array, the slab propagation region and the grating array can be arranged as a cantilever beam with the grating array being arranged at a free end of the cantilever beam.

Advantageously, this arrangement, where the deflection is actuated to enable beam-steering along a second axis, facilitates the deformation (i.e., the curvature) of the beam-steering device. In particular, when the metal layer with a higher thermal expansion efficient than the substrate is arranged on top of the substrate, the section may deform (downwards) towards the substrate. By providing the section of the substrate as a cantilever beam, any deformation of the section can be provided without obstacles.

According to another advantageous embodiment of the invention, the beam-steering device is provided in an integrated photonic platform. Preferably, the substrate is made of silicon. The beam-steering device may be arranged on a silicon wafer. Advantageously, integrated photonic platforms enable fabrication of a large number of photonic components on a single chip, resulting in a minimization of many conventional optical systems, which in turn results in reduced cost, scalability and higher yield. Accordingly, the components of the beam-steering device can be advantageously arranged on a single chip, thus enabling beam-steering in the integrated photonic platform with a formed light beam radiated out of the single chip in a desired propagation direction.

Features disclosed in the context of the beam-steering device and the embodiments thereof also represent preferred features of the inventive method of spatial steering a light beam and the embodiments thereof, and vice versa. The aforementioned aspects and inventive and preferred features, in particular with regard to the configuration of the beam-steering device as well as the dimensions and compositions of individual components which have been described in relation to the beam-steering device, therefore also apply for the method. The preferred embodiments, variants and features of the invention described above are combinable with one another as desired.

BRIEF DESCRIPTION OF THE DRAWINGS

Further details and advantages of the invention are described with reference to the attached drawings, which show in FIG. 1: a top-view illustration of an embodiment of a beam-steering device;

FIG. 2: illustrations of embodiments of gratings in combination with a slab propagation region;

FIG. 3: a side-view illustration of an end section of the beam-steering device according to an embodiment of the invention;

FIG. 4: a flowchart illustrating a method according to an embodiment of the invention.

DESCRIPTION OF PREFERRED
EMBODIMENTS

Figure 1:
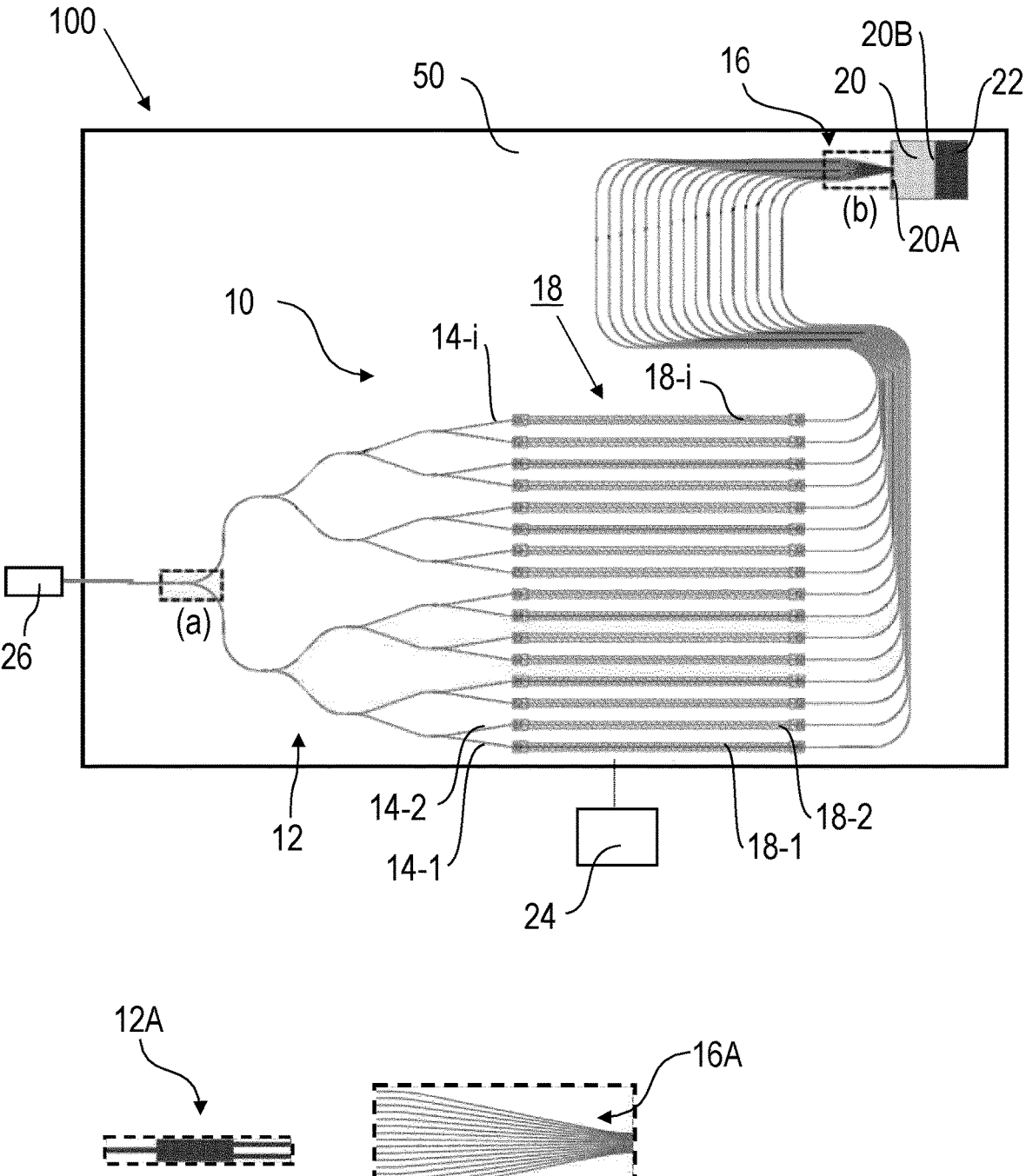
Figures 2, 3:
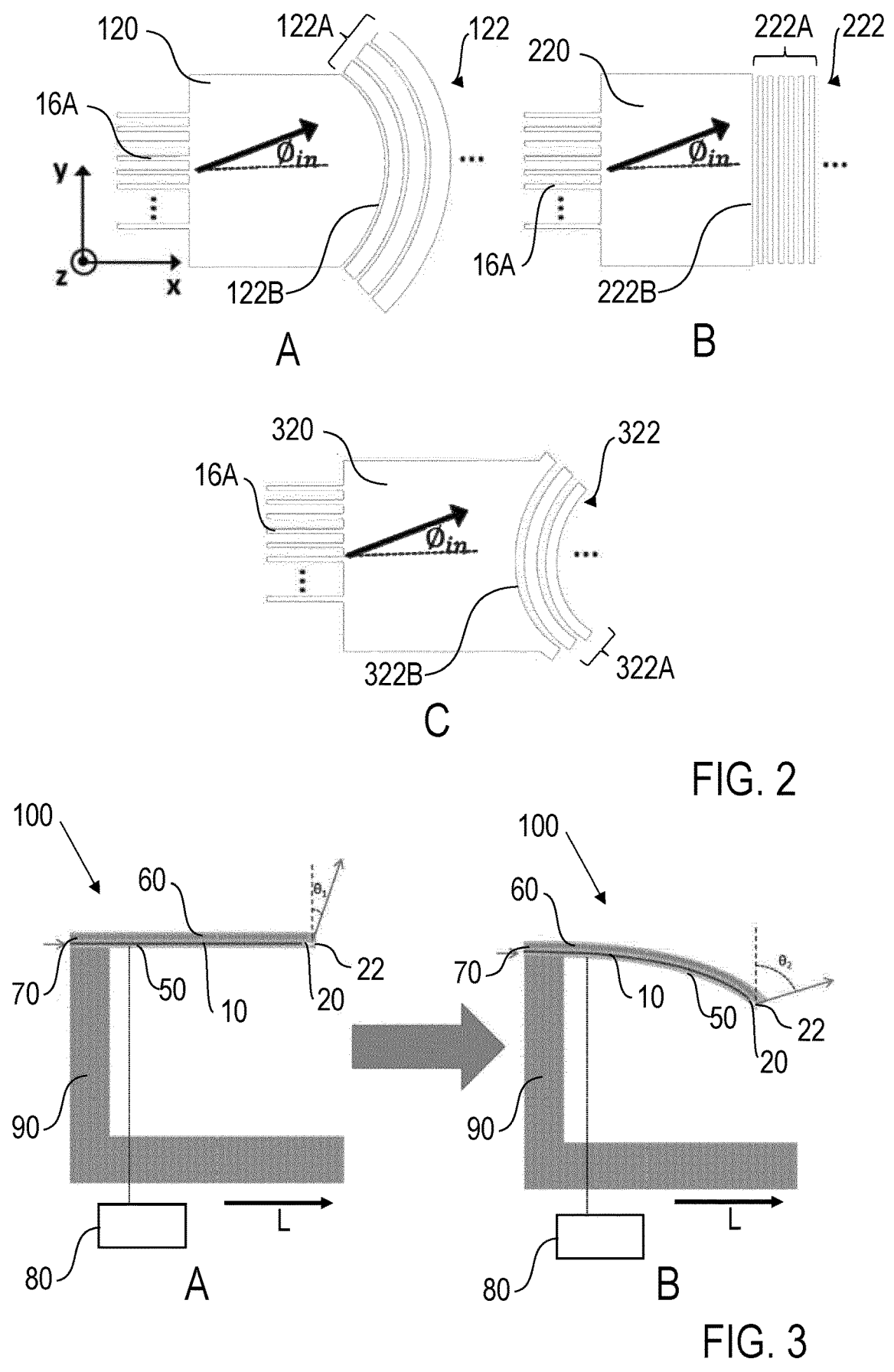

Features of preferred embodiments of the invention are described in the following with reference to the design of the beam-steering device as illustrated in FIGS. 1 to 3, and the method of the invention as illustrated in FIG. 4. It is noted that the implementation of the invention is not restricted to the active and passive optical components illustrated in an exemplary manner. For instance, embodiments of the invention can be modified with regard to the number, dimensions and materials of the waveguides and/or the dimensions and materials of the slab propagation region and gratings.

Furthermore, alternative assemblies for the light source device and the waveguide array known in the prior art can be employed with the inventive slab propagation region and grating array. The drawings are schematic illustrations, mainly for showing the inventive concept of spatial steering a light beam. In practice, the shape and size of the illustrated components can be selected and adapted in dependency on particular application requirements. For instance, the dimensions of the slab propagation region and grating array can be adapted for the desired wavelength range of emitted light, in particular light in the visible spectrum. Details described with reference to one of the illustrated embodiments, e.g., regarding the operation of the beam-steering device, can be employed with other embodiments in a corresponding manner.

Operation conditions of the beam-steering device, like the setting of each phase shifter device and/or the wavelength of the light emitted by the light source device to obtain a desired first angular direction, can be selected based on preliminary numerical simulations and/or tests. Furthermore, the operation conditions can be optimized during the measurement, e.g., by monitoring the far-field beam pattern. Optimization process can be automated. One or multiple control devices (see e. g., control device 24) can be provided for controlling the beam-steering device or components thereof, in particular for setting controlled shifts via the phase shifter device of each waveguide, tuning the wavelength of the light emitted by the light source device and/or setting a temperature via the temperature setting device.

FIG. 1 schematically shows an embodiment of the beam-steering device 100 being configured for spatial steering of a light beam. The beam-steering device 100 comprises a waveguide array 10 being arranged on a substrate 50 and comprising a waveguide array input 12, multiple waveguides 14-1, 14-2, . . . , 14-$i$ and a waveguide array output 16. The multiple waveguides 14-1, 14-2, . . . , 14-$i$ are adapted for simultaneously guiding light from the waveguide array input 12 to the waveguide array output 16. A phase shifter device 18 is provided, which comprises multiple phase shifter elements 18-1, 18-2, . . . , 18-$i$. Each waveguide 14-1, 14-2, . . . , 14-$i$ includes one of the phase shifter elements 18-1, 18-2, . . . , 18-$i$ being arranged for applying a controlled phase shift to the light guided in the related waveguide 14-1, 14-2, . . . , 14-$i$.

The phase shifter elements 18-1, 18-2, . . . , 18-$i$ are configured to induce the controlled phase shift of the propagating optical wave, i.e., the propagating light, in the respective waveguide 14-1, 14-2, . . . , 14-$i$. Each of the phase shifter elements 18-1, 18-2, . . . , 18-$i$ may comprise one of a thermo-optic, electro-optic, liquid crystal, and micro-electromechanical-systems device, and the phase shifter elements 18-1, 18-2, . . . , 18-$i$ are couple with a control device 24 controlling the phase shifter elements 18-1, 18-2, . . . , 18-$i$ according to a predetermined beam-steering task, e. g., for a static adjustment of the beam-steering or for a dynamic beam steering, like for display purposes.

The beam-steering device 100 further comprises a slab propagation region 20 and a grating array 22. The slab propagation region 20 is arranged between the waveguide array output 16 and the grating array 22 such that the light beam is angularly relayed by a beam angle $\phi$ (or indicated $\phi_{in}$ in FIG. 2) to the grating array 22 and side lobes of the light beam leave lateral sides of the slab propagation region 20 before reaching the grating array 22. The slab propagation region 20 is adapted to provide free propagation of the formed light beam. Accordingly, the light beam is not confined to the interior of the slab propagation region 20 and the walls of the slab propagation region 20 do not provide total reflection.

A first side 20A of the slab propagation region 20 is optically connected to the waveguide array output 16. A second side 20B of slab propagation region 20, which is arranged at an opposite side of the slab propagation region 20 than the first side 20A, is optically connected to the grating array 22. The dimensions of the slab propagation region are chosen depending on the desired beam angle range of $\phi$ for the light beam to reach the grating array 22.

The grating array 22 comprises at least one patterned grating providing an output of the beam-steering device 100, and it is in optical communication with the waveguide array output 16. The grating array 22 is configured to radiate a light beam out of the beam-steering device 100 to a surrounding, wherein a first angular direction of the radiated light beam with respect to the substrate 50 is determined by the controlled phase shifts applied to the light by the phase shifter elements 18-1, 18-2, . . . , 18-$i$ and a wavelength of the light guided in the waveguides 14-1, 14-2, . . . , 14-$i$.

The waveguide array 10 comprises a total of i=16 waveguides 14-1, 14-2, . . . , 14-$i$. The invention is not limited to this number of waveguides. Preferably, the waveguide array 10 comprises at least 8 waveguides. Each of the waveguides 14-1, 14-2, . . . , 14-$i$ may be made of a dielectric material, such as silicon nitride, and may be covered by a cladding layer, such as a cladding made of $SiO_2$.

The waveguide array input 12 is arranged for splitting the light originated from a light source device 26 into the waveguide array 10. The waveguide array input 12 comprises at least one input port adapted for receiving light from the light source device 26 and multiple output ports adapted for transferring the light to the multiple waveguides 14-1, 14-2, . . . , 14-$i$. Each of the multiple output ports is assigned to one of the waveguides 14-1, 14-2, . . . , 14-$i$. The waveguide array input 12 may comprise a multimode interference coupler, such as a series of 1×2 multimode interference coupler or a 1×N star coupler, being arranged for splitting the light originated from the light source device 26 into the waveguide array 10. In the exemplary embodiment of FIG. 1, a series of 1×2 multimode interference coupler 12A are employed with a single coupler 12A shown in the enlarged view of the cutout (a).

The waveguide array output 16 is configured such that the light at the waveguide array output 16 is superimposed for forming the light beam. The waveguide array output 16 decreases the pitch between neighboring waveguides 14-1, 14-2, . . . , 14-i towards the slab propagation region 20 to bring the light guided in the waveguides 14-1, 14-2, . . . , 14-i into close proximity to each other. The waveguide array output 16 may comprise a fan-in structure, preferably an S-bend fan-in structure, as shown in the enlarged view of the cutout (b).

The light source device 26 is coupled into the waveguide array input 12. Light emitted by the light source device 26 is directed at and received by the waveguide array input 12. The light source device 26 may be a source of coherent light, comprising a laser and/or a monochromatic light source emitting the light with a wavelength in the visible or infrared spectral range. Additionally, the light source device 26 may be tunable in terms of tuning the wavelength of the emitted light.

FIG. 2 illustrates three exemplary embodiments of the gratings 122, 222, 322 in combination with the slab propagation region 120, 220, 320. The gratings 122, 222, 322 comprise one of a concave (FIG. 2A), a linear (FIG. 2B) and a convex grating pattern (FIG. 2C) with respect to the propagation direction of the light beam in the slab propagation region 120, 220, 320.

Each of the grating patterns comprises multiple protrusions 122A, 222A, 322A being arranged with a constant grating pitch between the neighbouring protrusions 122A, 222A, 322A.

The second side 122B, 222B, 322B of the slab propagation region 122, 222, 322 may have the same profile as the respective grating pattern. Specifically, the second side 122B, 222B, 322B of the slab propagation region 122, 222, 322 may have a concave, flat or convex profile in alignment with the concave, linear or convex grating pattern, respectively.

FIG. 3 illustrates a side view of an end section of the beam-steering device 100. According to this exemplary embodiment, the beam the device 100 further comprises a metal layer 60 being arranged on the substrate 50. Preferably, the metal layer 60 and the substrate 50 have different thermal expansion coefficients. The metal layer 60 and the substrate 50 essentially form a bicomponent material.

The beam-steering device 10 may further comprise a temperature setting device 80 being arranged for setting a temperature of at least a portion of the substrate 50 and at least a portion of the metal layer 60 adjacent to the portion of the substrate 50. The substrate 50 with the waveguide array 10, the slab propagation region 20 and the grating array 22 are configured for a temperature-dependent deflection of the grating 22 along a second angular direction deviating from the first angular direction.

FIG. 3A shows the situation when no temperature is set by the temperature setting device 80. The beam-steering device 100 extends substantially straight in longitudinal direction L. By increasing the temperature of the portion of the substrate 50, a curvature is introduced to the beam-steering device 100 in the longitudinal direction L of the beam-steering device 100. Due to the increased temperature, the metal layer is adapted to expand further in L then the substrate. After the temperature has been increased, the beam-steering device 100 shows a curvature downwards in the longitudinal direction L, as shown in FIG. 3B. As a result, the propagation direction of the light beam is adjusted from the first angular direction $\theta_1$ to the second angular direction $\theta_2$.

In order to facilitate the deformation of the beam-steering device 100, a section of the substrate 50 carrying the waveguide array 10, the slab propagation region 20 and the grating array 22 preferably is arranged as a cantilever beam with the grating array 22 being arranged at a free end of the cantilever beam.

Features of embodiments of a method of beam-steering a light beam are illustrated in FIG. 4. Exemplary reference is made to employing a beam-steering device 100 as shown in FIGS. 1 and 3.

With step S1, light from the light source device 26 is coupled into the waveguide array 10. The light enters the waveguide array input 12 which splits the entering light into the multiple waveguides 14-1, 14-2, . . . , 14-i. The split light is then simultaneously guided by the multiple waveguides 14-1, 14-2, . . . , 14-i to the waveguide area output 16.

With step S2, a controlled phase shift is applied to the light guided in each of the waveguides 14-1, 14-2, . . . , 14-i by the phase shifter elements 18-1, 18-2, . . . , 18-i.

Different controlled phase shifts are applied to the light guided in each of the waveguides 14-1, 14-2, . . . , 14-i in order to set a desired first angular direction of the radiated light beam with respect to the substrate 50 and thereby also the desired beam angle $\phi$ of the beam propagating in the propagation slab region 20.

Generally, the controlled phase shifts are set in a fixed relation to each other. Since the light guided in each of the waveguides 14-1, 14-2, . . . , 14-i originates from the same light source device 26, the initial phase do is the same in all waveguides 14-1, 14-2, . . . , 14-i. This initial phase is increased or decreased by a factor $i \times \Delta\varphi$ in each of the waveguides where $\Delta\varphi$ is a set phase shift value and i is the numbering of each of the waveguides 14-1, 14-2, . . . , 14-i. In other words, the phase of the light in waveguide 14-1 is shifted by $\Delta\varphi$, the phase of the light in the neighboring waveguide 14-2 is shifted by $2 \times \Delta\varphi$, and so on. Other schemes or approaches known in the prior art may be applied to set the desired first angular direction.

With step S3, the light being output at the waveguide array output 16 is superimposed for forming the light beam. In order to do so, the phase-shifted light guided in each of the waveguides 14-1, 14-2, . . . , 14-i is brought into close proximity to each other by the waveguide array output 16 and guided into the single slab propagation region 20, where the light superimposes and produces a light beam due to interference effects. Hence, the light beam is formed in the slab propagation region 20 before the light is out-coupled by the grating array 22. The formed light beam comprises a main lobe and possible side lobes.

With step S4, the light beam is relayed by the beam angle $\phi$ from the waveguide array output 16 to the grating array 22 through the slab propagation region 20 being arranged such that the side lobes of the light beam leave lateral sides of the slab propagation region 20 before reaching the grating array 22.

The beam angle $\phi$, which is defined in the plane of propagation of the light inside the beam-steering device 100, depends on the phase shifts controlled by the phase shifter elements 18-1, 18-2, . . . , 18-i in each of the waveguides 14-1, 14-2, . . . , 14-i. Accordingly, the beam angle $\phi$ may be adjusted by varying the controlled phase shifts in each of the waveguides 14-1, 14-2, . . . , 14-*i*. Alternatively, e.g., when a 1×N star coupler is deployed as the waveguide array input 12, the beam angle φ may be adjusted by providing light with a different wavelength by the light source device 26.

With step S5, the light beam is deflected with the grating array 22 by radiating the light beam out of a plane of the beam-steering device 100 to the surrounding. The first angular direction of the radiated light beam with respect to the substrate 50 is determined by the controlled phase shifts applied by the phase shifter elements 18-1, 18-2, . . . , 18-*i* and the wavelength of the light guided in the waveguides 14-1, 14-2, . . . , 14-*i*.

The light beam reaches the grating array 22 at a position depending on the beam angle φ. The first angular direction directly depends on the beam angle φ. In terms of spherical coordinates, the first angular direction comprises an azimuthal angle corresponding to the beam angle φ. The polar angle depends, e.g., on the design of the beam-steering device and in particular the pattern of the at least one grating. Accordingly, the first angular direction may be varied by adjusting the controlled phase shifts applied in step S3 and/or tuning the wavelength of the light emitted by the light source device 26 in step S1.

The emitted light beam, which only comprises a single main lobe but no or ignorable side lobes (neglectable for a particular application of the inventive beam-steering device), can be observed, e.g., by a light detector in the far-field.

In addition to adjusting the propagation direction of the light beam in the first angular direction (defined by the beam angle φ) by varying the controlled phase shifts via the phase shifter elements 18-1, 18-2, . . . , 18-*i* and/or the wavelength emitted by the light source device 26, the propagation direction of the light beam may be adjusted by the second angular direction (e. g. $\theta_1$ or $\theta_2$) relative to the first angular direction by additionally setting a temperature of at least a portion of the substrate 50 via the temperature setting device 80.

By increasing the temperature of the portion of the beam-steering device 100, a curvature is introduced to the beam-steering device 100 in the longitudinal direction L. The metal layer 60, which has a higher thermal expansion coefficient than the substrate 50, expands further in the longitudinal direction L than the substrate 50. In accordance to the known properties of bimetals, the end section of the substrate 50, which is arranged as a cantilever beam with the grating array 22 being arranged at a free end of the cantilever beam, deforms downward towards the substrate 50. With increasing temperature, the deformation and thus the curvature of the beam-steering device 100 increases, resulting in a continuous tilting of the grating array 22 and a change of direction to which the grating array 22 is facing.

Hence, the propagation direction of the light beam is adjustable from the first angular direction (corresponding to $\theta_1$) without increased temperature of the portion of the beam-steering device 100 to the second angular direction $\theta_2$ with temperature increased via the temperature setting device 80.

Figure 5:
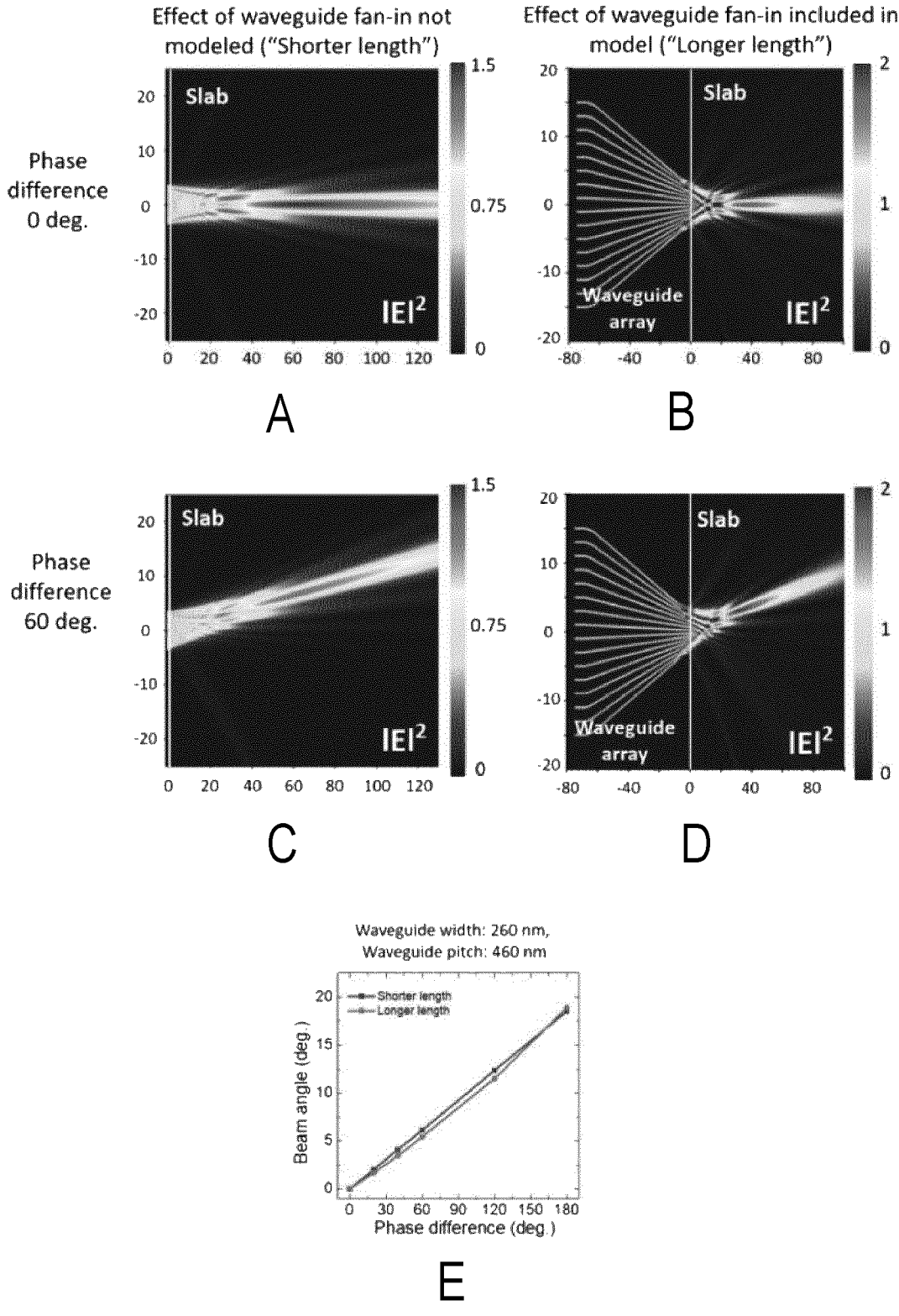
FIG. 5: simulation results, comparing results regarding a beam angle and light coupling between waveguides.

FIG. 5 illustrates simulation results, showing the top-down electric field intensity ($|$E$|^2$) profile of light propagating in the slab propagation region 20 (see FIG. 1). In this simulation, the light has a wavelength of 480 nm. Additionally, the waveguides 14-1, 14-2, . . . , 14-*i* are made of silicon nitride and have a thickness of 150 nm.

Results for simulations without controlled phase shifts are shown in FIGS. 5A and 5B, whereas results for simulations with applied controlled phase shifts are shown in FIGS. 5C and 5D. Additionally, the simulations in FIGS. 5A and 5C do not include the effect of light coupling between waveguides 14-1, 14-2, . . . , 14-*i* in the waveguide array 10, whereas the simulations in FIGS. 5B and 5D include this effect.

All results show that the light beam is formed in the slab propagation region 20 by the light guided in the waveguides 14-1, 14-2, . . . , 14-*i*. Furthermore, the formed light beam in FIGS. 5C and 5D is angularly relayed by the beam angle φ due to the applied phase shifts.

Comparing FIGS. 5A and 5B, or FIGS. 5C and 5D, optical coupling in the waveguide array 10 does not significantly degrade the steerable beam formation in the slab propagation region 20. This is also illustrated in the diagram of FIGS. 5E, showing a comparison of beam angle φ as a function of the applied phase shifts with and without considering the optical coupling in the waveguide array 10. Both graphs in FIG. 5E show only minor deviations from each other.

In general, the simulations can be used to determine suitable dimensions of the slab propagation region for the desired range of the beam angle φ and the desired wavelengths of the propagating light beam.

The features of the invention disclosed in the above description, the drawings and the claims can be of significance individually, in combination or sub-combination for the implementation of the invention in its different embodiments.

The invention claimed is:

1. A b-steering device, being configured for spatial steering of a light beam, the beam-steering device comprising:
   a waveguide array being arranged on a substrate and comprising a waveguide array input, multiple waveguides and a waveguide array output, wherein the multiple waveguides are adapted for simultaneously guiding light from the waveguide array input to the waveguide array output and for forming a light beam by superimposing the light guided by the waveguides,
   a phase shifter device being arranged for applying controlled phase shifts to the light guided in each of the waveguides, and
   a grating array including at least one patterned grating in optical communication with the waveguide array output, the grating array being configured to radiate the light beam out of the beam-steering device to a surrounding, wherein
   a slab propagation region is arranged between the waveguide array output and the grating array,
   the waveguide array output is arranged such that the light beam is formed with a main lobe and side lobes and with a beam angle in the slab propagation region, wherein the beam angle is determined by the controlled phase shifts applied to the light by the phase shifter device and a wavelength of the light,
   the slab propagation region is arranged such that the main lobe of the light beam is angularly relayed to the grating array and the side lobes of the light beam leave lateral sides of the slab propagation region before reaching the grating array, and
   the grating array is arranged to radiate the light beam out of the beam-steering device with a first angular direction with respect to the substrate, that is determined by the beam angle.

2. The beam-steering device according to claim 1, wherein
   the waveguide array output comprises a fan-in structure, preferably an S-bend fan-in structure.

3. The beam-steering device according to claim 1, wherein the grating array comprises at least one of a concave, a linear and a convex grating pattern with respect to a propagation direction of the light beam in the slab propagation region.

4. The beam-steering device according to claim 1, wherein the waveguide array input comprises a multimode interference coupler being arranged for splitting the light originated from a light source into the waveguide array.

5. The beam-steering device according to claim 4, wherein the waveguide array input comprises a series of 1×2 multimode interference coupler or a 1×N star coupler.

6. The beam-steering device according to claim 1, comprising at least one of the features:

the phase shifter device comprises multiple phase shifter elements, each of which being coupled with one of the waveguides, the waveguide array comprises at least 8 waveguides, each of the waveguides has a thickness below 500 nm, each of the waveguides is made of at least one of silicon nitride, silicon and silicon oxynitride, the substrate is made of silicon, and the waveguide array and the grating array are covered by a cladding layer, preferably being made of SiO2.

7. The beam-steering device according to claim 1, further comprising a temperature setting device being arranged for setting a temperature of at least a portion of the substrate, wherein the substrate with the waveguide array, the slab propagation region and the grating array are configured for a temperature-dependent deflection of the grating array along a second angular direction deviating from the first angular direction.

8. The beam-steering device according to claim 7, further comprising a metal layer being arranged on the substrate, wherein the metal layer and the substrate and surrounding materials have different thermal expansion coefficients.

9. The beam-steering device according to claim 1, further comprising an actuation device being configured for a mechanical actuation of a deflection of the substrate with the waveguide array, the slab propagation region and the grating array along a second angular direction deviating from the first angular direction.

10. The beam-steering device according to claim 7, wherein a section of the substrate carrying the waveguide array, the slab propagation region and the grating array is arranged as a cantilever beam with the grating array being arranged at a free end of the cantilever beam.

11. The beam-steering device according to claim 1, further comprising a light source device being coupled into the waveguide array input.

12. The beam-steering device according to claim 11, further comprising at least one of the light source device comprises at least one of a laser and a monochromatic light source emitting the light with a wavelength in the visible or infrared spectral range, and the phase shifter device comprises a light source device with a tunable wavelength of emission.

13. The beam-steering device according to claim 1, wherein the beam-steering device is provided in an integrated photonic platform.

14. A method of spatial steering of a light beam, the method comprising:

coupling light from a light source device into a waveguide array being arranged on a substrate and comprising a waveguide array input, multiple waveguides and a waveguide array output, wherein the multiple waveguides simultaneously guide the light from the waveguide array input to the waveguide array output, a controlled phase shift is applied to the light guided in each of the waveguides and a light beam is formed by superimposing the light guided by the waveguides in a slab propagation region, and deflecting the light beam with a grating array including at least one patterned grating in optical communication with the waveguide array output, wherein the grating array radiates the light beam out to a surrounding, wherein a slab propagation region is arranged between the waveguide array output and the grating array, the light beam is formed with a main lobe and side lobes and with a beam angle in the slab propagation region, wherein the beam angle is determined by the controlled phase shifts applied to the light by a phase shifter device and a wavelength of the light, the slab propagation region is arranged such that the main lobe of the light beam is angularly relayed to the grating array and the side lobes of the light beam leave lateral sides of the slab propagation region before reaching the grating array, and the grating array radiates the light beam out of a beam-steering device with a first angular direction with respect to the substrate, that is determined by the beam angle.

15. The method of spatial steering of a light beam according to claim 14, further comprising setting a temperature of at least a portion of the substrate with a temperature setting device, and temperature-dependent deflection of the grating array along a second angular direction deviating from the first angular direction.

16. The method of spatial steering of a light beam according to claim 14, further comprising:

mechanical actuation of a deflection of the substrate with the waveguide array, the slab propagation region and the grating array along a second angular direction deviating from the first angular direction.

17. The method of spatial steering of a light beam according to claim 14, which is executed with a beam-steering device being configured for spatial steering of a light beam, the beam-steering device comprising:

a waveguide array being arranged on a substrate and comprising a waveguide array input, multiple waveguides and a waveguide array output, wherein the multiple waveguides are adapted for simultaneously guiding light from the waveguide array input to the waveguide array output and for forming a light beam by superimposing the light guided by the waveguides, a phase shifter device being arranged for applying controlled phase shifts to the light guided in each of the waveguides, and a grating array including at least one patterned grating in optical communication with the waveguide array output, the grating array being configured to radiate the light beam out of the beam-steering device to a surrounding, wherein a slab propagation region is arranged between the waveguide array output and the grating array,                    5 the waveguide array output is arranged such that the light beam is formed with a main lobe and side lobes and with a beam angle in the slab propagation region, wherein the beam angle is determined by the controlled phase shifts applied to the light by the phase shifter  10 device and a wavelength of the light, the slab propagation region is arranged such that the main lobe of the light beam is angularly relayed to the grating array and the side lobes of the light beam leave lateral sides of the slab propagation region before reaching the  15 grating array, and the grating array is arranged to radiate the light beam out of the beam-steering device with a first angular direction with respect to the substrate, that is determined by the beam angle.                                    20

*     *     *     *     *